United States Patent [19]
Colley

[11] Patent Number: 5,488,378
[45] Date of Patent: Jan. 30, 1996

[54] METHOD AND APPARATUS FOR DETERMINING POSITIONS ON THE EARTH CORRESPONDING TO AN OBSERVED RATE OF CHANGE OF SATELLITE RANGE

[75] Inventor: Jaime B. Colley, Laguna Niguel, Calif.

[73] Assignee: Rockwell International Corporation, Seal Beach, Calif.

[21] Appl. No.: 174,085

[22] Filed: Dec. 28, 1993

[51] Int. Cl.⁶ .............................. G01S 5/02; H04B 7/185
[52] U.S. Cl. ............................................................. 342/357
[58] Field of Search ............................................... 342/357

[56] References Cited

U.S. PATENT DOCUMENTS

| | | | |
|---|---|---|---|
| 3,430,234 | 2/1969 | Wright | 343/6 |
| 3,906,204 | 9/1975 | Rigdon et al. | 364/456 |
| 4,599,620 | 7/1986 | Evans | 343/357 |
| 5,148,179 | 9/1992 | Allison | 342/357 |
| 5,202,829 | 4/1993 | Geier | 364/449 |

OTHER PUBLICATIONS

Schmid, Jr. et al., "Satellite Doppler Data Processing Using A Microcomputer IEEE Trans. on Geoscience Electronics", vol. GE–16, No. 4, Oct. 1928 pp. 340–348.

Sandretto, "Terestrial Navigation by Artificial Satellites", Electrical Communication, vol. 39, No. 1, 1964 pp. 155–167.

Guier et al., "A Satellite Doppler Navigation System", Proc. of the IRE, Apr. 1960 pp. 507–516.

*Primary Examiner*—Gregory C. Issing
*Attorney, Agent, or Firm*—George A. Montanye; David J. Arthur; Susie H. Oh

[57] ABSTRACT

A method for using a value of range rate observed by a receiver, such as a GPS receiver, at a particular location, along with other satellite information, to determine the coordinates of points on the surface of the earth from which this value of range rate would be observed. These coordinates are given in an earth-centered, earth-fixed (ECEF) coordinate system, and they form a locus of points of equal range rate. The coordinates of these points provide estimates of the location of the GPS receiver.

17 Claims, 5 Drawing Sheets

METHOD AND APPARATUS FOR DETERMINING POSITIONS ON THE EARTH CORRESPONDING TO AN OBSERVED RATE OF CHANGE OF SATELLITE RANGE

BACKGROUND OF THE INVENTION

1. Field of the Invention

This invention relates to navigation using a global positioning system (GPS) receiver which receives information from an earth-orbiting satellite. The invention particularly applicable to making an initial estimate of the position of such a receiver.

2. Description of the Related Art

Although it has broader applicability, embodiments of the present invention arose in the continuing effort to improve the process by which a GPS receiver acquires signals transmitted by a constellation of satellites orbiting the earth. The satellite signals are necessary for navigation using the GPS. When a GPS receiver is turned on and begins to receive radio signals, it must begin searching these signals for transmissions from the GPS satellites. At any given location on the earth, the receiver can only receive signals from those satellites which are visible at that location. Because the satellite signals typically have a low signal-to-noise ration, acquisition of particular satellites can be improved if the visible satellites which are transmitting signals can be determined.

This determination, however, is not immediately apparent from the radio signals detected by the receiver. Typically, GPS receivers are capable of making a determination as to which unobscured satellites are transmitting signals by evaluating the satellite signal outputs relative to the location of the receiver itself. However, the receiver often does not know its location even approximately, in which case the receiver cannot use a known location to determine which satellites are visible.

Thus, the process of finding the signals from visible satellites begins with finding a signal from one of them and then using the identity of that satellite and its transmitted information (associated with a pseudo-random code) to select which of the other satellites' transmissions to search for next. This process is continued until transmissions are received from the minimum number of GPS satellites necessary for navigation. Generally, four satellites are required for three-dimensional tracking.

However, acquiring the necessary satellite signals from a cold start, that is, when the receiver location and/or time are unknown, is a relatively time consuming process. For example, it may require up to fifteen minutes for satellite acquisition in commercial GPS receiver units currently on the market. As can be understood, there is a substantial commercial advantage in finding a way to reliably perform this acquisition with significantly increased speed.

One approach used to improve satellite signal acquisition is to acquire a first signal, then make an initial estimate of the region of the earth in which the receiver is located by calculating a "pseudo range" from the satellite. The pseudo range describes the measurement of range from the receiver to the satellites using an imprecise clock. The pseudo range, however, is an inexact range value due to a bias of fixed magnitude in each range estimate attributable to the clock error.

The receiver then searches for signals from satellites known to be visible from the initially-estimated region of probable location. Upon acquisition of another signal, another calculation of pseudo range is made to define a narrower region of location of the receiver, and so on. As the region of location grows smaller, the probability of finding additional satellite signals improves. As mentioned above, however, the pseudo range approach has an inherent drawback. The calculated value of pseudo range is affected by drift in the internal clock of the GPS receiver. If the drift is large, the estimated region of location of the receiver may be unreasonably large, and would be correspondingly uncertain. Such a result would be of diminished value.

SUMMARY OF THE INVENTION

The present invention relates to a method and apparatus for estimating the location of a position on the earth where the range rate and doppler value of the satellite signals are constant.

More particularly, in accordance with embodiments of the invention, there is provided a method for using a value of a satellite's range rate observed by a receiver at a particular location, in addition to other satellite data, to determine the coordinates of points on the surface of the earth from which this value of range rate would be observed. These coordinates are given in an earth-centered, earth-fixed (ECEF) coordinate system, and they form a locus of points of equal range rate. They are also points of equal doppler value, and thus define a curve called an "isodop" line.

The coordinates of points on the isodop line provide estimates of the location of the receiver. This may be an initial estimate in the process of acquiring the satellite signals necessary for navigation. If a second satellite signal and a second isodop line are found, the intersection of the two lines provides a localized estimate of the receiver location.

Accordingly, embodiments of the present invention provide a determination of GPS receiver position as an alternative to range-based navigation. The invention has the advantages that the position estimate provided has less uncertainty attributable to receiver clock drift than a pseudo range estimate, and is not particularly vulnerable to initial assumptions. In addition, it is a substantial commercial advantage that the time required by a receiver to acquire all of the necessary initial satellite signals, that is, the "time to first fix," is significantly reduced.

DESCRIPTION OF THE PREFERRED EMBODIMENT

In accordance with embodiments of the present invention, it has been found that the rate of change of the range, i.e., the "range rate," from a satellite to a receiver is useful in estimating a region of location of the receiver. A computed value of the range rate is less affected by clock drift than is pseudo range, and the resultant geometric constraints limit the possible values for the range rate. By determining which locations on the surface of the earth correspond to the satellite range rate value calculated by the receiver, these locations may be used to determine which satellite signals to search for next. In addition, the range rate may be used to develop a complete navigation method which is an alternative to range-based navigation.

As discussed in more detail below, in embodiments of the invention, there is established a satellite frame of reference, which may consist of orthogonal axes aligned with the satellite velocity vector and the gravity vector at the satellite. A third axis may be orthogonal to these other axes. Similarly, an earth-centered, earth-fixed (ECEF) coordinate system describes the translation of coordinates of the origin of the satellite velocity vector representing the satellite's position relative to the earth. It will be recognized that other coordinate systems and axis arrangements may be implemented using translated or otherwise modified equations, described below.

An observed range rate enables computation of the angle between the satellite velocity vector and a line-of-sight from the satellite to the particular location of the receiver. The line-of-sight from the satellite to each point on the line on the earth's surface along which the satellite's range rate is constant, i.e., the isodop line, forms the same angle with the satellite velocity.

Using geometry, the lengths of a number of these lines-of-sight to points on the isodop line can be calculated along with their orientations in the satellite frame of reference. The latter orientations are used in combination with the vector orientation of the satellite frame of reference in the ECEF coordinate system to determine the vector components of the lines-of-sight in the ECEF coordinate system. Starting from the ECEF position of the satellite, which is known as a part of the information received from the satellite, the ECEF line-of-sight vectors from the satellite are used to provide the ECEF location of the points on the isodop line.

Thus, embodiments of the invention provide for fast and accurate position estimation of a GPS satellite, which in turn provides for a precise determination of the location of the GPS receiver. Embodiments of the present invention overcome calculation uncertainty due to errors in measured clock time or satellite position, or both. By measuring the region of probable location of a GPS satellite according to the rate of change of satellite range, an accurate assessment may be made.

Figure 1:
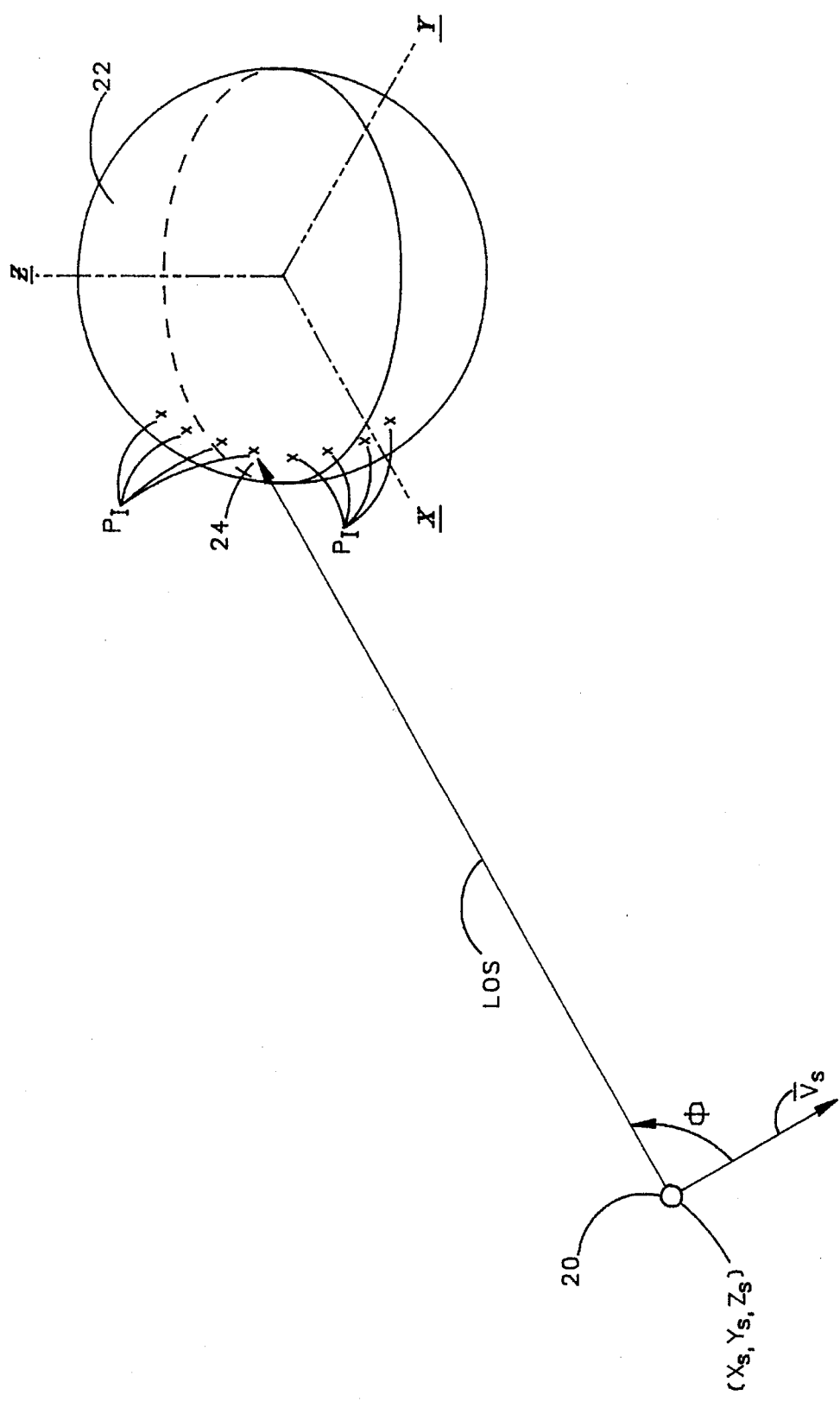
FIG. 1 is a perspective view of a satellite orbiting the earth, and points on an isodop line.

As illustrated in FIG. 1, a GPS satellite 20 orbits the earth 22, modeled in connection with the invention as a sphere. A GPS receiver (not shown) at a particular location 24 on the surface of the earth has acquired the signal from the satellite. The satellite transmits information called an "almanac" that includes the position coordinates $(X_S, Y_S, Z_S)$ of the satellite in an earth-centered, earth-fixed (ECEF) coordinate system, illustrated in the figure with three orthogonal axes labeled x, y, and z. From the almanac received from the one or more satellites, the receiver computes not only the position coordinates, but also the components $(V_{Sx}, V_{Sy}, V_{Sz})$ of the satellite velocity vector $V_S$, in the ECEF coordinate system.

A line-of-sight from the satellite 20 to the particular receiver location 24 is shown as a vector LOS. The line-of-sight has a length L, which represents the range of the satellite to the receiver. From received satellite signals, the receiver can determine the rate of change of the range. This will be referred to herein as observing the range rate, represented by the variable I. When a receiver at a location 24 observes a particular value for I, embodiments of the invention determine the coordinates $P_{Ix}$, $P_{Iy}$, $P_{Iz}$ (in the ECEF coordinate system) of points $P_I$ from which there would be observed this same value of range rate I. The receiver can then approximate its location along the isodop line formed by the points $P_I$, thus leading to faster and more accurate subsequent satellite acquisition.

Figure 2:
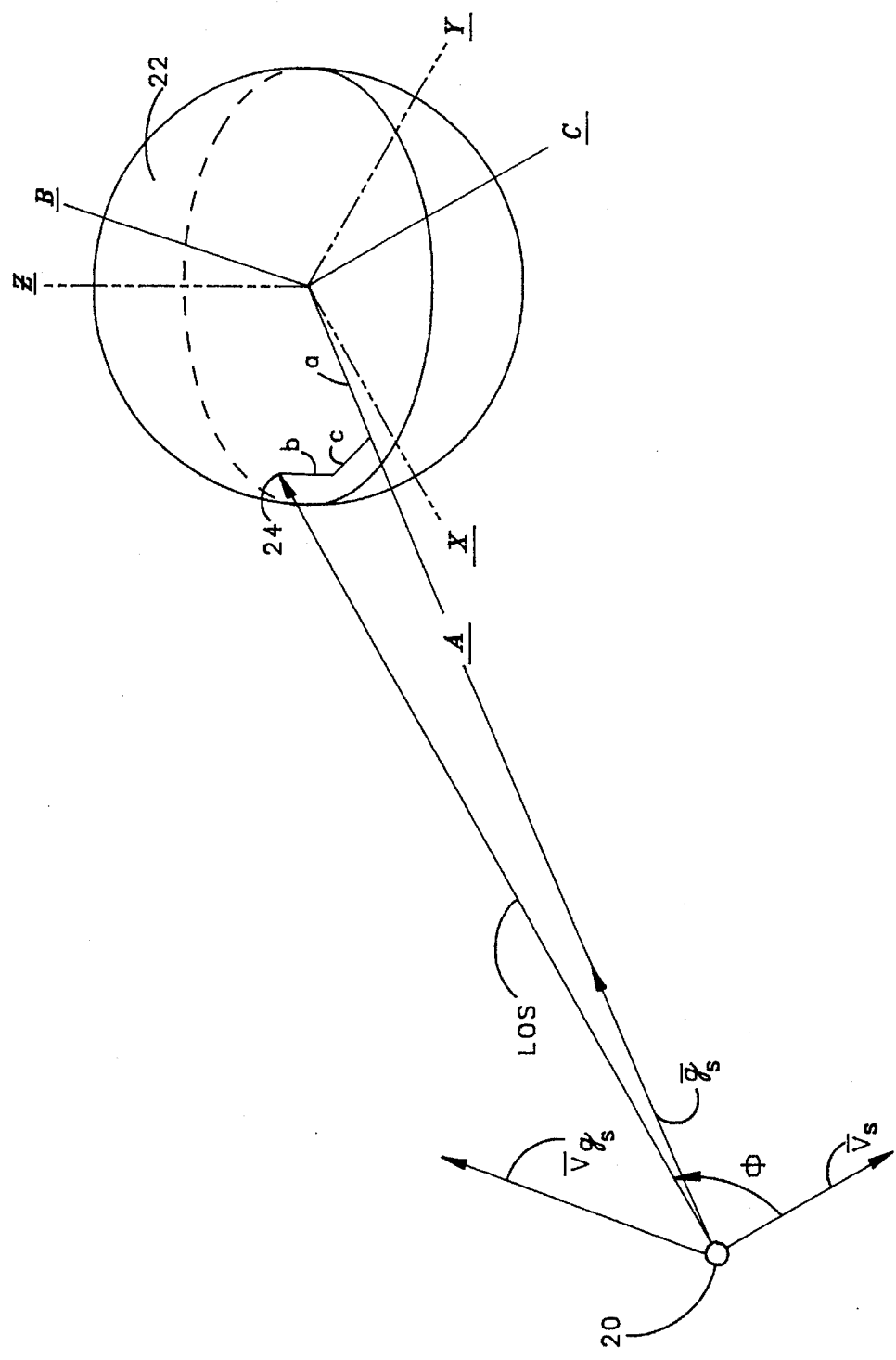
FIG. 2 is a perspective view of the relationship between a satellite frame of reference and an earth-centered, earth-fixed (ECEF) coordinate system.

FIG. 2 illustrates initial steps in the determination made by embodiments of the present invention. Several orthogonal vectors are defined with their origins at the satellite 20. A gravitational vector $g_S$ is directed from the center of mass of the satellite to that of the spherical earth. The satellite velocity vector $V_S$ is assumed to be perpendicular to the gravitational vector. A third vector $V_{g_s}$ is defined as the vector product $V_{g_s} = V_S \times g_S$. The three orthogonal vectors $V_S$, $g_S$ and $V_{g_s}$ form a coordinate system having its origin at the satellite; this system is referred to in this application as the satellite frame of reference.

Another coordinate system, with axes A, B and C, is earth-centered. The A axis is colinear with and opposite in direction to the gravitational vector $g_S$; the B axis is parallel to $V_{g_s}$; and the C axis is parallel to the velocity vector $V_S$. In this coordinate system, the coordinates of receiver location 24 are (a, b, c). As illustrated in FIG. 2, the A, B, C coordinate system is not earth-fixed like the x, y, z system, but rotates about the earth's center as the satellite moves.

To locate the satellite position 20 relates to the receiver location 24, the approximate location of the receiver must first be determined. According to embodiments of the present invention, by calculating the rate of change I of satellite range, a number of points on an isodop line can be generated. As explained above, an isodop is a line on the surface of the earth where the value of the satellite range rate is constant and all of the points on the isodop line have equal doppler value.

As explained above, the satellite range rate is defined by the rate of change of range of the satellite relative to the receiver as the satellite orbits the earth. The range rate is determined by, and thus represents, the frequency shift of the orbiting satellite's signals. Consequently, the range rate and doppler value are the same. The range rate observed by a receiver at a particular location, in addition to either satellite almanac or ephemeris parameters, are used to determine the coordinates of points on the surface of the earth from which the particular value of range rate would be observed. The coordinates form a locus of points of equal range rate and thus provide estimates of the location of the GPS receiver. If further satellite signals and isodop lines are found, the intersection of the lines provides a localized estimate of the receiver location.

The doppler measurements represent the stretching or contracting of transitions between bits in the signal data stream transmitted by the satellite. The range rate along the isodop is thus a function of the satellite's velocity vector and the receiver's orientation to the velocity vector. The range rate I is given by the relationship $I = -|V_S| \cos \phi$, where $\phi$ is the angle between the line-of-sight LOS and the velocity vector $V_S$. Thus, the range rate is the component of the satellite velocity along the line-of-sight.

Referring to FIG. 1, it can be understood that for each of the points $P_I$, the line-of-sight from the satellite forms the same angle $\phi$ with the satellite velocity vector $V_S$. In the problem to be solved, we can use the observed value of I and received values of $(V_{Sx}, V_{Sy}, V_{Sz})$ to compute $$\cos\phi = \frac{-I}{|V_S|} \quad \text{[equation 1]}.$$

Figure 3:
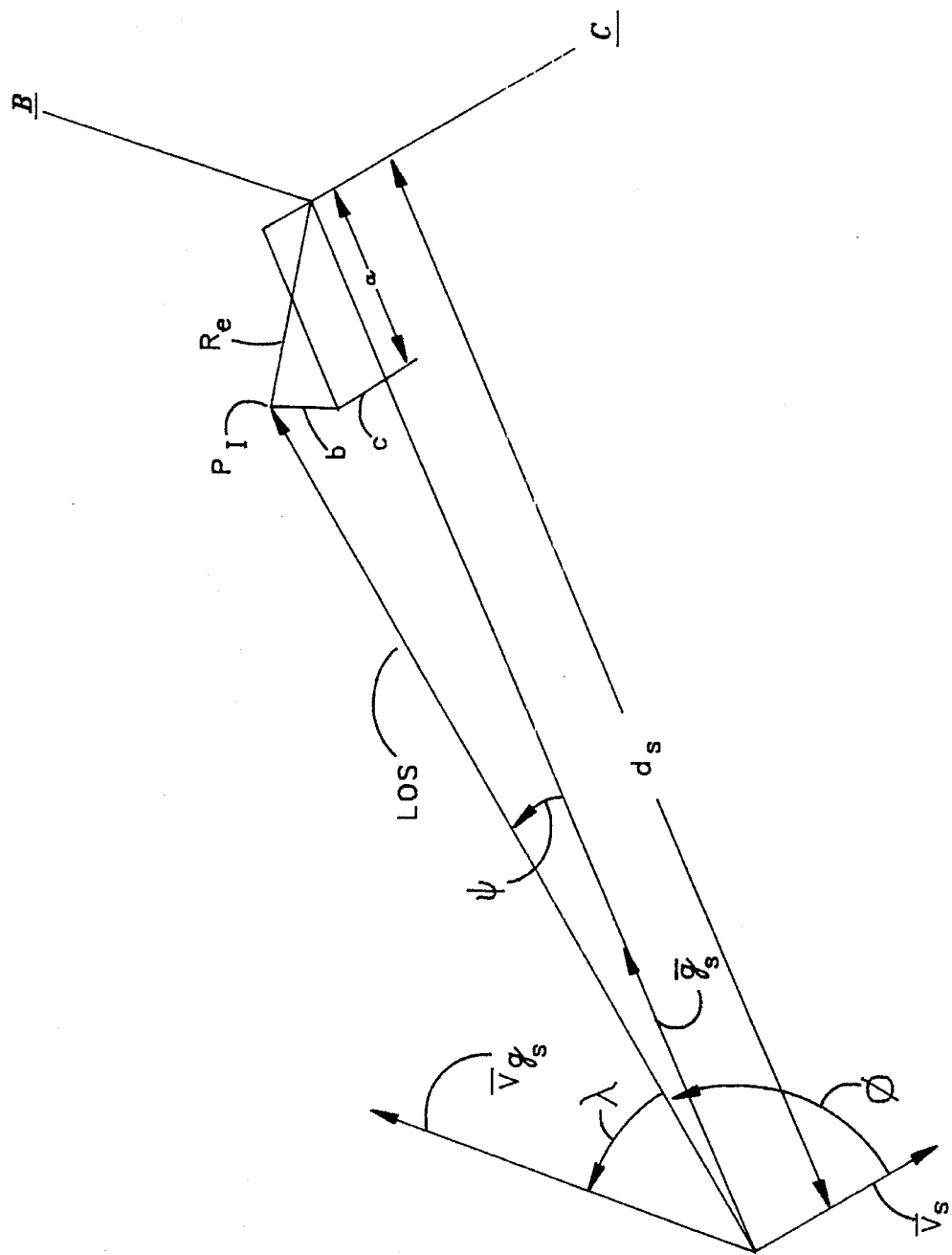
FIG. 3 is a perspective view of the geometric relationships between a satellite and earth points used in computations according to an embodiment of the invention.

Considering FIG. 3, there are observed additional relationships. From the position coordinates $(X_S, Y_S, Z_S)$ (FIG. 1) of the satellite, there is readily calculated the distance $d_s$ of the satellite from the center of the earth, by $d_s = \sqrt{X_S^2 + Y_S^2 + Z_S^2}$. The cosine of the angle $\psi$ between the line-of-sight vector LOS and the gravitational vector $g_S$ is given by $$\cos\psi = \frac{d_s - a}{L} \quad \text{[equation 2]}.$$

The value a equals the distance from the center of the earth, i.e., the origin of its coordinate system, to a point on the cartesian coordinate system A, B, C. This coordinate system is used as the fixed reference for a generic sphere of radius $R_e$ (as shown in FIG. 3) such that $a^2 + b^2 + c^2 = R_e^2$. Accordingly, the cosine of the angle between LOS and $V_{g_s}$ is given by $$\cos\lambda = \frac{b}{L} \quad \text{[equation 3]}.$$

The length L of the line-of-sight LOS is given by $$L = \sqrt{(d_s - a)^2 + b^2 + c^2} \quad \text{[equation 4]}.$$

As noted above, the radius of the spherical model earth 22 is $R_e$. Since $$R_e^2 = a^2 + b^2 + c^2 \quad \text{[equation 5]},$$

then $c_e^2 = R^2 - a^2 - b^2$.

Substituting the latter into equation 4 yields $$L = \sqrt{(d_s^2 - 2ad_s + a^2) + b^2 + (R_e^2 - a^2 - b^2)},$$

which simplifies to $$L = \sqrt{d_s^2 - 2ad_s + R_e^2} \quad \text{[equation 6]}.$$

Figure 4:
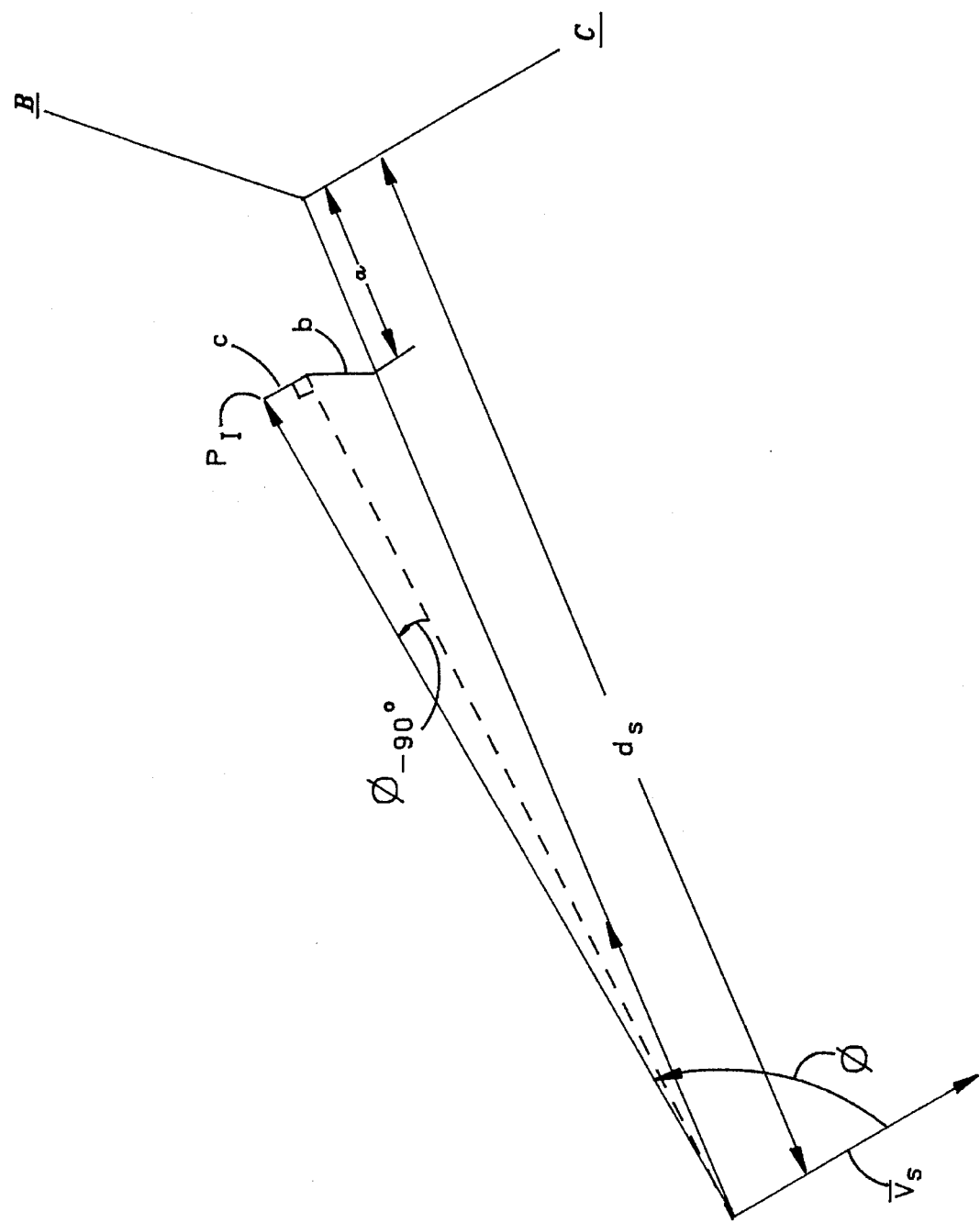
FIG. 4 is a perspective view of other aspects of the geometric relationships of FIG. 3.

FIG. 4 illustrates somewhat different aspects of the geometric relationships of FIG. 3. From FIG. 4 it can be seen that $$\tan\phi = \frac{\sqrt{(d_s - a)^2 + b^2}}{c}.$$

Accordingly, $$c^2 = \frac{(d_s - a)^2 + b^2}{\tan^2\phi}.$$

Substituting the latter into equation 5 yields $$R_e^2 = a^2 + b^2 + \frac{(d_s - a)^2 + b^2}{\tan^2\phi}$$

which, through algebraic and trigonometric manipulation, becomes $$b = \sqrt{R_e^2 \sin^2\phi - a^2 + (2ad_s - d_s^2)\cos^2\phi} \quad \text{[equation 7]}.$$

The preceding description has developed several equations for variables in the satellite frame of reference and the corresponding A, B, C coordinate system. The above equations will now be applied to determine the solution vector L (satellite range) referenced to a generalized satellite frame.

The points on the isodop line can then be determined by extending outward a certain distance from the satellite position, oriented at angles $\phi$, $\lambda$ and $\psi$, with respect to the generalized satellite coordinate system.

The following development describes transformations that relate variables in the satellite frame of reference and the A, B, C coordinate systems to the ECEF coordinate system. It should be noted that a significant characteristic of the above equations is that the satellite reference frame can be translated to another location without altering the relationship between the solution vector and the reference frame since the equations are generated according to a sphere of constant radius. Thus, the relationship does not change as long as (1) the distance between the center of the reference frame and the center of the sphere is constant, and (2) the satellite gravity axis points toward the center of the sphere.

With respect to the ECEF coordinate system, the components ($e_{Vx}$, $e_{Vy}$, $e_{Vz}$) of the unit vector $e_V$ of $V_S$ are, by definition, $$e_{Vx} = \frac{V_{Sx}}{|V_S|} \quad e_{Vy} = \frac{V_{Sy}}{|V_S|} \quad e_{Vz} = \frac{V_{Sz}}{|V_S|} \quad \text{[equation 8]}.$$

Similarly, the components ($e_{gx}$, $e_{gy}$, $e_{gz}$) of the unit vector $e_g$ of the gravitational vector $g_s$, with respect to the ECEF system, are given by the relationships $$e_{gx} = \frac{X_S}{d_s} \quad e_{gy} = \frac{Y_S}{d_s} \quad e_{gz} = \frac{Z_S}{d_s} \quad \text{[equation 9]}.$$

The unit vector $e_{Vg}$ of $V_{g_s}$ is given by $e_{vg} = e_v \times e_g$. Vector multiplication of equations 8 and 9 provides the components ($e_{Vgx}$, $e_{Vgy}$, $e_{Vgz}$) of $e_{Vg}$, with respect to the ECEF coordinate system as $$e_{Vgx} = e_{Vy}e_{gz} - e_{Vz}e_{gy}$$

$$e_{Vgy} = e_{Vz}e_{gx} - e_{Vx}e_{gz}$$

$$e_{Vgz} = e_{Vx}e_{gy} - e_{Vy}e_{gx} \quad \text{[equations 10]}.$$

Thus, with the determination of equations 8, 9, and 10, there is derived the vector orientation of the satellite frame of reference with respect to the ECEF coordinate system.

Another part of the calculation of the coordinates ($P_{Ix}$, $P_{Iy}$, $P_{Iz}$) is to determine the orientation of the line-of-sight LOS with respect to the satellite frame of reference. This is expressed in terms of the unit vector $e_L$ of LOS with components ($e_{Lx}$, $e_{Ly}$, $e_{Lz}$) in the ECEF system.

By definition, the cosine of the angle between two unit vectors is equal to the dot product of the vectors. Accordingly, $\cos\phi = e_V \cdot e_L$. The solution vectors are related to the satellite reference frame by means of the direction cosines. Expressed in terms of vector components, $\cos\phi = e_{Vx}e_{Lx} + e_{Vy}e_{Ly} + e_{Vz}e_{Lz}$. More generally, $$\begin{vmatrix} \cos\phi \\ \cos\psi \\ \cos\lambda \end{vmatrix} = \begin{vmatrix} e_{Vx} & e_{Vy} & e_{Vz} \\ e_{gx} & e_{gy} & e_{gz} \\ e_{Vgx} & e_{Vgy} & e_{Vgz} \end{vmatrix} \begin{vmatrix} e_{Lx} \\ e_{Ly} \\ e_{Lz} \end{vmatrix} \quad \text{[equation 11]}.$$

Because the unit vectors of the satellite frame of reference form a basis for the satellite reference system, the inverse of the matrix of the reference system unit vectors in equation 11 is equal to its transpose. Accordingly, with some manipulation of the matrices, $$\begin{vmatrix} e_{Lx} \\ e_{Ly} \\ e_{Lz} \end{vmatrix} = \begin{vmatrix} e_{Vx} & e_{gx} & e_{Vgx} \\ e_{Vy} & e_{gy} & e_{Vgy} \\ e_{Vz} & e_{gz} & e_{Vgz} \end{vmatrix} \begin{vmatrix} \cos\phi \\ \cos\psi \\ \cos\lambda \end{vmatrix}$$

That is, $e_{Lx} = e_{Vx}\cos\phi + e_{gx}\cos\psi + e_{Vgx}\cos\lambda$ $e_{Ly} = e_{Vy}\cos\phi + e_{gy}\cos\psi + e_{Vgy}\cos\lambda$ $e_{Lz} = e_{Vz}\cos\phi + e_{gz}\cos\psi + e_{Vgz}\cos\lambda$ [equations 12].

Figure 5:
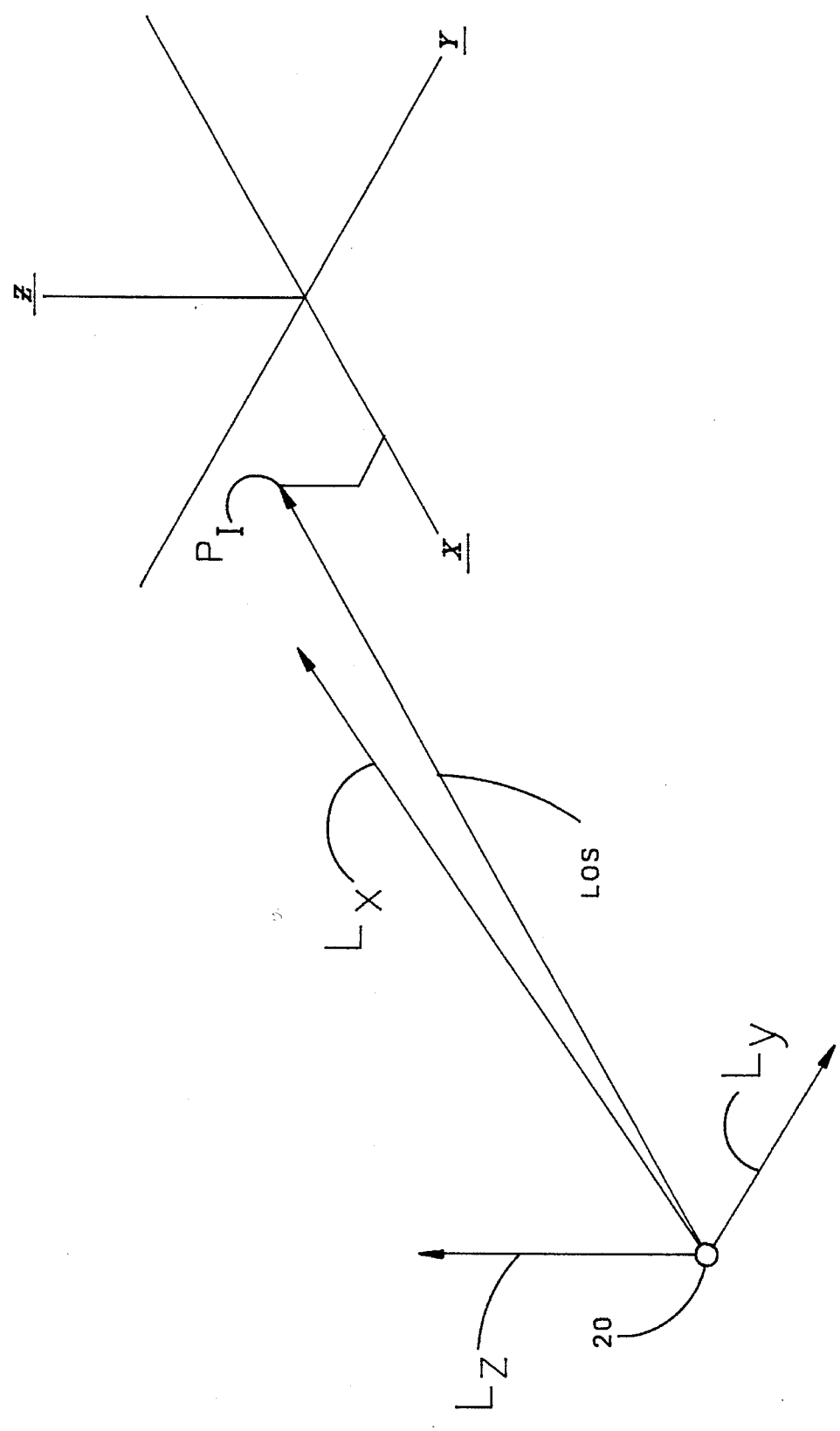
FIG. 5 is a perspective view of the vector components for final determination of isodop points according to embodiments of the present invention.

As can be seen in FIG. 5, the coordinates of the points $P_I$ along the isodop in ECEF terms can be determined from the position of the satellite 20 and the components of the LOS vector which connects the satellite and $P_I$. That is, $P_{Ix} = X_S + L_x$ $P_{Iy} = Y_S + L_y$ $P_{Iz} = Z_S + L_x$ [equation 13].

where:

$Lx = L \cdot eLx$ $Ly = L \cdot eLy$ $Lx = L \cdot eLz$ [equations 14], such that:

$P_{Ix} = X_S + Le_{Lx}$ $P_{Iy} = Y_S + Le_{Ly}$ $P_{Ix} = Z_S + Le_{Lz}$ [equations 15].

Consequently, it will be understood that the location of the isodop points $P_I$ can be generated according to the satellite's range rate, the satellite's position in ECEF coordinates, the satellite's velocity in ECEF terms, the radius of the sphere representing the earth, and a distance form the center of the earth along the gravity axis a. Although the value of the distance along the gravity axis a is variable, the remaining values depend upon various geometric limits.

Practical Sequence of Method Steps

Because method embodiments of the invention are intended to be carried out in real time in a commercial device, the sequence of steps can be arranged to be more practical than the order in which the equations have been developed above. The following represents a preferred embodiment:

(1) Determine, in either order, the components ($e_{Vx}$, $e_{Vy}$, $e_{Vz}$) according to equations 8, and the components ($e_{gx}$, $e_{gy}$, $e_{gz}$) according to equations 9.

(2) Use the values ($e_{Vx}$, $e_{Vy}$, $e_{Vz}$) and ($e_{gx}$, $e_{gy}$, $e_{gz}$) to determine the components ($e_{Vgx}$, $e_{Vgy}$, $e_{Vgz}$) according to equations 10. At this point, with the determination of the components of $e_V$, $e_g$, and $e_{Vg}$, the orientation of the satellite frame of reference with respect to the ECEF coordinate system has been determined.

(3) Before or after the above steps, determine $\cos\phi$ according to equation 1, using the observed value of range rate.

The above steps compute values that do not change among the various points $P_I$. The next sequence of steps is performed for each different $P_I$. One of the variables related to the location of the point $P_I$, such as a, b, c or LOS in FIG. 3, is selected to be given different values corresponding to different locations of the points $P_I$. In the approach of the equations developed above, the variable a was selected.

(4) The selected variable, a in this example embodiment, is given one of a set of values. The range of meaningful values for a can be computed from the geometry of the situation.

(5) Determine the length L of a specific LOS corresponding to the selected value of a, according to equation 6.

(6) Determine the orientation of the specific LOS with respect to the satellite frame of reference, using equations 2, 7 and 3 to determine functions of angles $\psi$ and $\lambda$, along with that already determined for angle $\phi$.

(7) Determine the components of the specific LOS with respect to the ECEF coordinate system, using equations 12 and 14.

(8) Determine the location coordinates ($P_{Ix}$, $P_{Iy}$, $P_{Iz}$) with respect to the ECEF system using equations 13 or 15. The values of ($P_{Ix}$, $P_{Iy}$, $P_{Iz}$) determined in this way describe a locus of points from which would be observed a particular value of range rate I. This isodop line provides an estimate of the location of the GPS receiver. Other isodop lines from other satellites can be used to refine this estimate.

(9) The steps beginning with giving a value to a are repeated for any remaining values of a, for which $P_I$ is to be computed.

Although a preferred embodiment of the invention has been described, it is to be understood that various changes, substitutions and alterations can be made without departing from the spirit and scope of the invention as defined by the appended claims.

What is claimed is:

1. A method of determining, for a particular position, location coordinates for the particular position, the method comprising the steps of:

receiving, at a receiver located at the particular position, signals from at least one earth-orbiting satellite, the signals including orbital information indicating the general location of the at least one satellite with respect to an earth-centered, earth-fixed (ECEF) coordinate system;

measuring the rate of change of the range from the satellite to the receiver; and calculating, based upon the satellite orbital information and measured rate of change of the range from the satellite to the receiver, a first plurality of points representing a first line on the earth's surface along which the rate of change of range of the satellite is constant, such that the location of the receiver at the particular position is near the first line.

2. The method of claim 1, further comprising the steps of:

receiving, at the receiver, signals from a second earth-orbiting satellite;

measuring the rate of change of the range from the second satellite to the receiver; and calculating a second plurality of points representing a second line on the earth's surface which intersects the first line, wherein the receiver is approximately located near the intersection of the first and second lines.

3. The method of claim 2, further comprising the step of calculating additional pluralities of points to determine additional corresponding lines which intersect the first and second lines, wherein the particular position is approximately located near the intersection of the lines.

4. An apparatus for estimating a location of a particular position on the earth according to signals transmitted by at least one satellite orbiting the earth, comprising:

a receiver for receiving the transmitted signals, the receiver being located at the particular position, wherein the signals indicate an associated satellite from which they are transmitted;

means for determining the location of the satellite and the speed of the satellite as it orbits the earth, relative to the particular position;

means for measuring a rate of change of the range from the receiver to the satellite, as the satellite orbits the earth; and means for determining a first plurality of points representing a first line on the earth's surface along which the rate of change of the range of the satellite is constant, wherein the receiver, located at the particular position, is located near the first line.

5. The apparatus of claim 4, wherein the receiver receives signals from additional earth-orbiting satellites such that the ranges from the additional satellites to the receiver are measured, and further wherein corresponding pluralities of points representing corresponding lines n the earth's surface which intersect the first line are determined, such that the intersection of the pluralities of points defines the location of the receiver at the particular position.

6. A method of estimating the position of a particular location on the surface of the earth, with respect to an earth-centered, earth-fixed (ECEF) x, y, z coordinate system, from signals transmitted by a plurality of earth-orbiting satellites, each satellite having an associated position $(X_S, Y_S, Z_S)$, a distance $d_S$ to the center of the earth, a velocity vector $V_S$ having vector components $(V_{Sx}, V_{Sy}, V_{Sz})$ and magnitude $|V_S|$, the earth having a radius $R_e$ and a gravitational vector $g_S$ relative to the satellite, the method comprising the steps of:

receiving, at a receiver located at the particular location on the surface of the earth, signals from at least one of the earth-orbiting satellites, wherein the signals include orbital information describing the rate of change of the range I between the receiver and the at least one satellite;

measuring the rate of change of the range I between the receiver and the at least one satellite according to the satellite orbital information; and determining coordinates $(P_{Ix}, P_{Iy}, P_{Iz})$ of multiple points $P_I$ on the earth based upon the measured rate of change of the range I to the satellite, wherein the coordinates $(P_{Ix}, P_{Iy}, P_{Iz})$ describe a locus of points which provide estimates of the particular location of the receiver.

7. A method of estimating the position of a particular location on the surface of the earth using information received from a plurality of earth-orbiting satellites, by determining location coordinates $(P_{Ix}, P_{Iy}, P_{Iz})$ with respect to an earth-centered, earth-fixed (ECEF) x, y, z coordinate system of multiple points $P_I$ on the surface of the earth, from which points may be observed a rate of change of the range I to the satellite, with the method using satellite information received at a receiver, the satellite information including the values of the position $(X_S, Y_S, Z_S)$ of the satellite with respect to said coordinate system, the distance $d_S$ of the satellite from the center of the earth, the velocity vector $V_S$ of the satellite with respect to said coordinate system, $V_S$ having vector components $(V_{Sx}, V_{Sy}, V_{Sz})$ and magnitude $|V_S|$, and an earth gravitational vector $g_S$ at the satellite, the method comprising the steps of:

establishing in the receiver a satellite frame of reference having axes aligned, respectively, with the velocity vector $V_S$ and the gravitational vector $g_S$;

deriving the vector orientation of the satellite frame of reference with respect to the ECEF coordinate system according to $|V_S|$, $(V_{Sx}, V_{Sy}, V_{Sz})$, $d_S$, $(X_S, Y_S, Z_S)$;

using I to determine a function of an angle $\phi$ which is formed by the line of the velocity vector $V_S$ and each of multiple lines of-of-sight from the satellite to the points $P_I$;

making the following determinations for each of multiple values of a variable, which values correspond to locations of the points $P_I$ in the satellite frame of reference:

selecting one of the multiple values of the variable;

determining, for the selected value of the variable, the length L of a specific line-of-sight between the satellite and that point $P_I$ which corresponds to the selected value;

deriving, for the selected value of the variable using the function of angle $\phi$, the orientation of the specific line-of-sight with respect to the satellite frame of reference;

using said derived orientation of the specific line-of-sight with respect to the satellite frame of reference, along with the length L, and said derived orientation of the satellite frame of reference with respect to the ECEF coordinate system, to derive vector components of the specific line-of-sight with respect to said ECEF coordinate system; and determining the location coordinates $(P_{Ix}, P_{Iy}, P_{Iz})$ using the derived components of the specific line-of-sight with respect to the ECEF coordinate system, and the position.

8. A method of estimating the position of a particular location on the surface of the earth using information received by a receiver from a plurality of earth-orbiting satellites and determining location coordinates $(P_{Ix}, P_{Iy}, P_{Iz})$, with respect to an earth-centered, earth-fixed (ECEF) x, y, z coordinate system, of multiple points $P_I$ on a spherical model of the earth, from which points the receiver may observe a rate of change of the range I to the satellite, the information transmitted from a satellite indicating the values of the position $(X_S, Y_S, Z_S)$ of the satellite with respect to the ECEF coordinate system, the distance $d_S$ of the satellite from the center of the earth, the velocity vector $V_S$ having vector components $(V_{Sx}, V_{Sy}, V_{Sz})$ and magnitude $|V_S|$, the radius $R_e$ of the spherical model, and an earth gravitational vector $g_S$ at the satellite, the method comprising the steps of:

determining the cosine of an angle $\phi$ formed by the velocity vector $V_S$ and multiple lines-of-sight between the satellite and the points $P_I$, according to the relationship $$\cos\phi = \frac{-I}{|V_S|} \; ;$$

determining the components $(e_{gx}, e_{gy}, e_{gz})$ of the unit vector of $V_S$, with respect to the ECEF coordinate system;

determining the components $(e_{vx}, e_{vy}, e_{vz})$, with respect to the ECEF coordinate system, of a unit vector $V_{gs}$ of the earth gravitational vector $g_S$;

determining, for each of multiple values of a variable a, where a and b are the values of the A and B coordinates, respectively, $P_I$ in another coordinate system which is earth-centered with the A axis being collinear with and opposite in direction to the gravitational vector gs, and the B axis being parallel with the vector $V_{gs}$, according to the following steps:

selecting one of the multiple values of a;

determining the length L of a specific line-of-sight from the satellite to a point $P_I$ which corresponds to the selected value of a;

computing, according to L, a function of an angle $\psi$ formed by said specific line-of-sight and the gravitational vector $g_S$;

determining the b coordinate of $P_I$;

computing, according to b, a function of an angle $\lambda$ formed by said specific line-of-sight and the vector $V_{gs}$;

determining the components ($e_{Lx}$, $e_{Ly}$, $e_{Lz}$) of a unit vector of said specific line-of-sight using cos $\phi$ and said computed functions $\psi$ and $\lambda$ and the unit vectors of $V_S$, $G_S$, and $V_{gs}$, with respect to said ECEF coordinate system; and determining the location coordinates ($P_{Lx}$, $P_{Ly}$, $P_{Lz}$) according to the relationships $P_{Lx}=X_S+Le_{Lx}$ $P_{Ly}=Y_S+Le_{Ly}$ $P_{Lz}=Z_S+Le_{Lz}$.

9. The method of claim 8, wherein the vector $V_{g_s}$ is the vector product of the velocity vector $V_S$ and the gravitational vector $g_S$.

10. The method of claim 8, wherein the components ($e_{Vx}$, $e_{Vy}$, $e_{Vz}$) are determined, with respect to the ECEF coordinate system, according to $$e_{Vx} = \frac{V_{Sx}}{|V_S|} \quad e_{Vy} = \frac{V_{Sy}}{|V_S|} \quad e_{Vz} = \frac{V_{Sz}}{|V_S|}.$$

11. The method of claim 8, wherein the components ($e_{gx}$, $e_{gy}$, $e_{gz}$) are determined, with respect to the ECEF coordinate system, according to the relationships $$e_{gx} = -\frac{X_S}{d_s} \quad e_{gy} = -\frac{Y_S}{d_s} \quad e_{gz} = -\frac{Z_S}{d_s}.$$

12. The method of claim 8, further comprising the step of determining the unit vector components ($e_{Vgx}$, $e_{Vgy}$, $e_{Vgz}$), with respect to the ECEF coordinate system, of a vector which is the vector product of $V_S$ and the earth gravitational vector $g_S$, according to the relationships $e_{Vgx}=e_{Vy}e_{gz}-e_{Vz}e_{gy}$ $e_{Vgy}=e_{Vz}e_{gx}-e_{Vx}e_{gz}$ $e_{Vgz}=e_{Vx}e_{gy}-e_{Vy}e_{gx}$.

13. The method of claim 8, wherein the length L of a specific line-of-sight from the satellite to that point $P_I$ which corresponds to the selected value of a is determined according to the relationship $$L=\sqrt{d_S^2 - 2ad_S + R_e^2}.$$

14. The method of claim 8, wherein the function of angle $\psi$ formed by said specific line-of-sight is determined according to $$\cos\psi = \frac{d_S - a}{L}.$$

15. The method of claim 8, wherein the distance b is determined according to $$b = \sqrt{R_e^2\sin^2\phi - a^2 + (2ad_S - d_s^2)\cos^2\phi}.$$

16. The method of claim 8, wherein the angle $\lambda$ formed by said specific line-of-sight is determined according to $$\cos\lambda = \frac{b}{L}.$$

17. The method of claim 8, wherein the components ($e_{Lx}$, $e_{Ly}$, $e_{Lz}$) are determined, with respect to the ECEF coordinate system, according to the relationships $e_{Lx}=e_{Vx}\cos\phi+e_{gx}\cos\psi+e_{Vgx}\cos\lambda$ $e_{Ly}=e_{Vy}\cos\phi+e_{gy}\cos\psi+e_{Vgy}\cos\lambda$ $e_{Lz}=e_{Vz}\cos\phi+e_{gz}\cos\psi+e_{Vgz}\cos\lambda$.

* * * * *